(12) United States Patent
Britton

(10) Patent No.: US 6,592,043 B1
(45) Date of Patent: Jul. 15, 2003

(54) FIXTURE TO MOUNT A MINIATURE PROXIMITY TRANSPONDER TO ANOTHER ARTICLE

(76) Inventor: Rick A. Britton, 4009 W. 150th St., Leawood, KS (US) 66224

( * ) Notice: Subject to any disclaimer, the term of this patent is extended or adjusted under 35 U.S.C. 154(b) by 0 days.

(21) Appl. No.: 10/151,468

(22) Filed: May 18, 2002

Related U.S. Application Data

(63) Continuation-in-part of application No. 09/932,453, filed on Aug. 16, 2001.
(60) Provisional application No. 60/229,084, filed on Aug. 30, 2000, and provisional application No. 60/226,256, filed on Aug. 17, 2000.

(51) Int. Cl.[7] .............................................. G06K 19/06
(52) U.S. Cl. ...................................... 235/492; 235/488
(58) Field of Search ................................ 235/492, 486, 235/487, 488, 451; 156/89.12

(56) References Cited

U.S. PATENT DOCUMENTS

| | | | | |
|---|---|---|---|---|
| 5,346,576 A | * | 9/1994 | Kobayashi et al. | 156/293 |
| 5,671,525 A | * | 9/1997 | Fidalgo | 235/488 |
| 6,021,949 A | * | 2/2000 | Boiron | 235/492 |
| 6,296,190 B1 | * | 10/2001 | Rendleman | 235/492 |
| 6,349,881 B1 | | 2/2002 | Wilkey et al. | 235/492 |
| 6,412,701 B1 | * | 7/2002 | Kohama et al. | 235/488 |
| 6,458,234 B1 | | 10/2002 | Lake et al. | 156/230 |
| 6,482,495 B1 | | 11/2002 | Kohama et al. | 428/67 |
| 6,486,780 B1 | | 11/2002 | Garber et al. | 340/572.1 |

OTHER PUBLICATIONS

Sokymat Data Sheet on Unique 1400 TAG, Product Part Nos. 911424 (ø20 mm), 91143 (ø30 mm), 911454 (ø50 mm); Sokymat, SA, Switzerland (Revision date Aug. 1995).

* cited by examiner

Primary Examiner—Daniel St. Cyr
(74) Attorney, Agent, or Firm—Jonathan A. Bay

(57) ABSTRACT

A fixture for a miniature thin-profile RFID proximity transponder has cap and a planar base, both produced from thin flexible plastic sheet stock. The cap is formed with an inset center that is bounded by a relatively planar, relatively floppy brim that is bounded by a spaced outer edge. The inset center is shaped and inset to define an open cavity to closely accommodate the transponder. The planar base is about the same size as a planar surface containing the cap's outer edge for closing the open cavity. An ultrasonically welded seam is utilized to join the cap's brim to a matching portion of the base in order to form thereby a relatively floppy brim composite with the transponder is situated in the closed cavity in a close fit. Adhesive on the base's exterior side allows adhesive attachment of the combination fixture and transponder to another article.

20 Claims, 8 Drawing Sheets

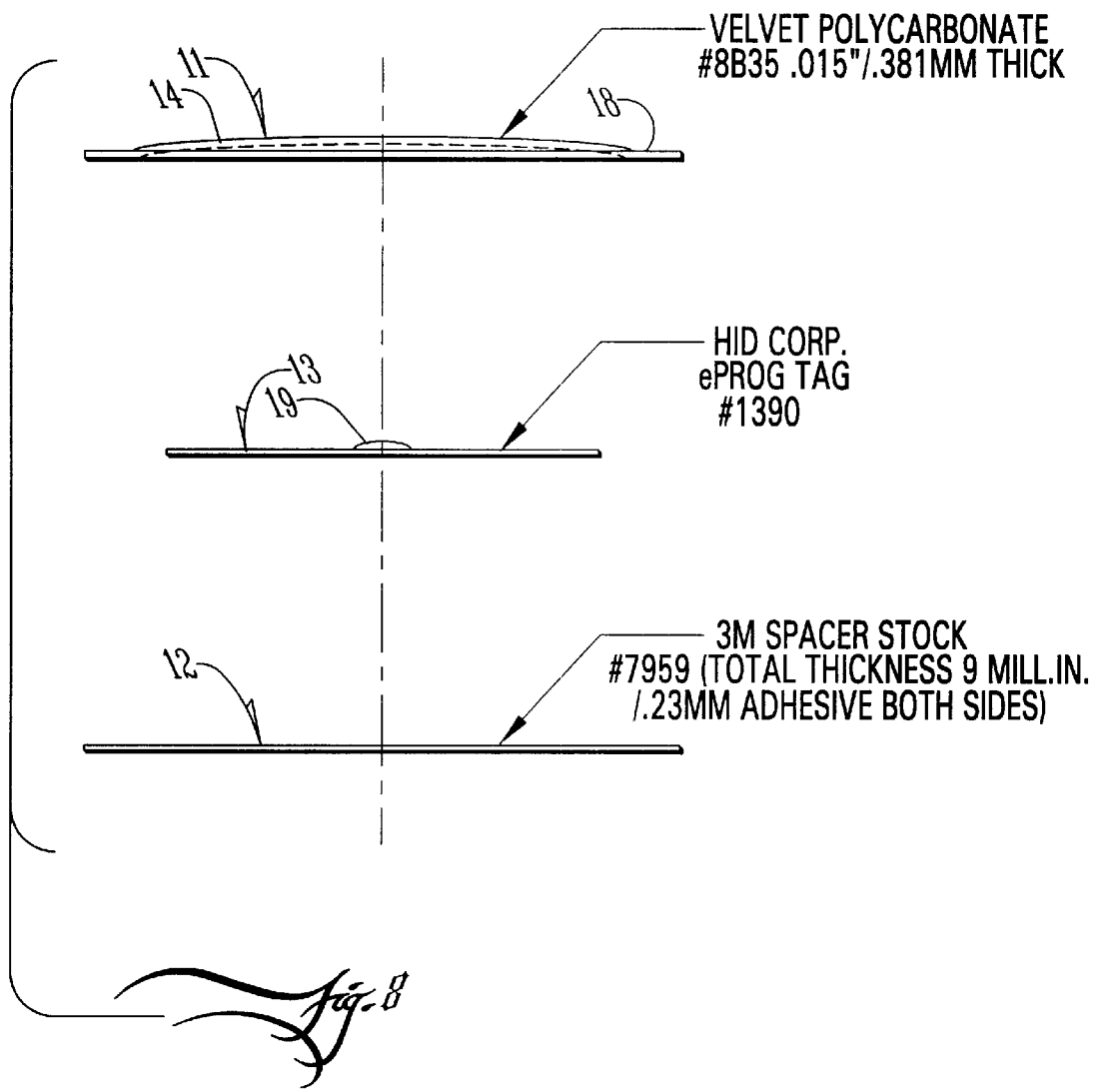
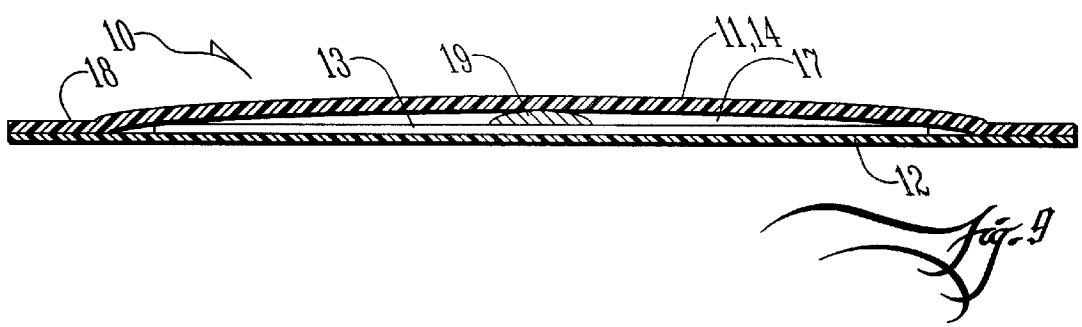

(INTERNAL ePROX NOT SHOWN IN THIS VIEW.)

ULTRASONICALLY SEAM WELD PERIMETER ALL THE WAY AROUND. OVERSIZE AS REQUIRED FOR WELDING, THEN DIE CUT TO SIZE.

NOTE: ARTWORK SHALL NOT CALL FOR PRINTERS INK IN ULTRASONIC WELD AREA AROUND PERIMETER.

FIXTURE TO MOUNT A MINIATURE PROXIMITY TRANSPONDER TO ANOTHER ARTICLE

CROSS-REFERENCE TO RELATED APPLICATION(S)

This is a continuation-in-part of application Ser. No. 09/932,453, filed Aug. 16, 2001, which claims the benefit of U.S. Provisional Application No. 60/226,256, filed Aug. 17, 2000, and U.S. Provisional Application No. 60/229,084, filed Aug. 30, 2000.

BACKGROUND OF THE INVENTION

1. Field of the Invention

The invention relates to a fixture for mounting a miniature proximity transponder to another article. Miniature proximity transponders are known in the art and have been put to use to date mainly in applications for signaling access control panels for protecting access-ways from unauthorized breach of access. The fixture in accordance with the invention makes use of the prior art, miniature proximity transponders more attractive for expanding to use in other applications such as and without limitation, for arming or disarming an automatic, premise-monitoring alarm system (eg., burglary and/or burglary/fire alarm system), or for attaching to an asset as a tracking device for an asset tracking system.

A number of additional features and objects will be apparent in connection with the following discussion of preferred embodiments and examples.

2. Prior Art

Security measures are employed in a variety of ways to provide automatic monitoring of various properties or assets. One common example is a premise-monitoring alarm system. It monitors a given protected premise—say, for example, a residential home, a commercial property, a bank vault, or an ATM machine and the like—for the occurrence of a given alarm event:—e.g., an unwanted intrusion, unauthorized motion in a vacated area, or smoke and so on. Access control systems prevent unauthorized access to bounded secure areas through a protected access-way. For example, organizations use access control systems to restrict entry and exit to and from given secure areas to authorized personnel only. Asset tracking systems prevent or monitor unauthorized removal of a protected asset away from or past through a tracking station or access-way.

Such security systems as alarm systems, access control systems, and/or asset tracking systems can be thought of simply as having armed and dis-armed states. Consider an alarm system for a residential property. A user departing the residence may arm or activate the alarm system by punching in the arm or activate commands at the control panel when walking out the door. Upon return, when a/the user re-enters the door, typically this user has a short time period to dis-arm the alarm system. The use has to move rather quickly to find and disarm the control panel by entering a code. Hence the activities of arming and disarming has generally involved typing in commands or codes at a keypad.

Access control is nowadays more typically associated with plastic, wallet-sized cards featuring bar code or magnetic-swipe technology. For example, personnel who may be authorized access through a restricted access-way are given such a plastic card. The plastic card will have an encoded magnetic strip or else a bar code and so on. The user passes through the restricted access-way by swiping a mag-striped card through an appropriate reader, presenting a bar-coded plastic card underneath an optical reader. The user must physically handle and manipulate the card through or under the reader. The user may keep the card in a billfold. If a user wants more handy access to the card, then the user can wear it on clothing or around the neck as dangled from a ribbon or beaded-chain or the like.

When approaching a protected access-way, an authorized party's goal is to disarm the access control system just long enough to pass through, like to get a door to open or unlock. Asset tracking involves tagging an asset with a device which, when moved relative to a tracking system, provides an alert.

To turn to another matter of the prior art, the "HID Corporation" of Irvine, Calif., provides a radio-frequency identification (RFID) technology for unlocking doors and the like. The technology comprises a proximity reader that is stationed next to the corresponding door, and a proximity transponder to activate the reader. The transponder is a passive RFID device. The transponder has no battery. In other words, it has no power storage device of any kind onboard. The transponder ekes out the power it needs from a tightly wound, fine-wire coil which functions both as a passive inductor and an "active" signal-transmitting antenna. The inductor aspects of the coil induce sufficient power from an electromagnetic field emitted by the reader. Hence the reader's field supplies by inductance the power needed by the transponder to operate its circuit.

Thus the transponder requires no additional power to operate. The RFID proximity technology was designed for use in applications that traditionally have used bar code or magnetic-swipe technology. For example, door or access control is sometimes controlled by taking a plastic card having an encoded magnetic strip and swiping it through an appropriate reader. Or else by presenting a bar-coded plastic card underneath an optical reader. Unlike mag-swipe or bar-code cards, the RFID proximity transponder does not need to be physically handled or even visible when read by the reader.

Therefore, if the RFID proximity transponder is encased in a wallet-sized plastic card, a user can insert the RFID proximity transponder into a billfold like any other business or credit card or driver's license. That way, for example, if the billfold is worn in a waist-pocket or in a purse at the hip, the user only need swish his (or her) hip in the vicinity of the reader. Then the door that is controlled by the reader will un-lock and the user can enter.

The above-referenced HID Corporation of Irvine, Calif., has miniaturized an RFID proximity transponder to a size smaller than a U.S. quarter-dollar coin. This is shown by for example FIG. 2. The transponder shown by FIG. 2 optionally corresponds to HID Corp.'s "eProx Tag," model no. 1390. The prior art effort to date to attach to another article such miniaturized RFID proximity transponders as shown by FIG. 2 has included the following.

The prior art has completely encased the miniaturized RFID proximity transponder of FIG. 2 in a hard plastic coin or token (this is not shown by the drawings). This hard plastic casing can be likened to a "tiddly-wink" chip.

There are shortcomings associated with the hard plastic case. The hard plastic case is rigid and thick. The hard plastic case has a square-edged periphery. Mounting the hard plastic case to an article or surface requires a bonding agent like epoxy, hot glue or an adhesive or the like. Regardless of the bonding agent used, the square-edged periphery tends to catch against other objects in the environment. As a result, the hard plastic case gets knocked off easily despite the purported strength of the bonding agent.

This problem is promoted by the following matter. Many of the articles that a user would like to bond the "tiddly-wink" on, present challenges for bonding agents. In the case of a billfold proper, billfold material is flexible and the matte will tear away if the "tiddly-wink" scrapes on something. In the case of a key head, the mounting surface is likely to be substantially non-absorbent like metal or enamel—and then not flat either—and so on, as with cell phones and pagers. The mounting surfaces thereon are likely non-absorbent and smoothly warped. Experience teaches that, the absence of a good flat surface of appropriate material tends to find that the tiddly wink is highly vulnerable to getting scraped off.

Nevertheless, the problem is not with the users' choice of articles to mount the tiddly wink, but the tiddly wink's construction itself. It is an object of the invention to overcome the shortcomings of the prior art provide an improved means of mounting the miniaturized proximity transponder of FIG. 2.

Other prior art fixture products for miniature proximity transponders have been introduced by Sokymat, SA, of Switzerland. Sokymat makes a CD/DVD label which is a washer-shaped RFID label having outside dimensions of about a 34 mm outside diameter by about a 0.4 mm thickness, with a 16 mm central hole to co-align with the central hole of the given CD or DVD (ie., part no. 601501). The 601501 CD/DVD label is attached by gluing or, as more particularly recited by Sokymat literature therefor, by gluing onto "flat and clean non-conductive surfaces, specially proven for Polycarbonate (CD or DVD)."

Sokymat also makes an Inventory and Security label (ie., part no 601500) which is a rectangular RFID label measuring about 50 mm by 40 mm rectangularly and having again a thickness of about 0.4 mm thick. Likewise, the 601500 Inventory and Security label is attached by gluing or, as more particularly recited by Sokymat literature therefor, by gluing onto "flat and clean non-conductive surfaces."

A further RFID transponder product introduced by Sokymat perhaps since 1995 indeed incorporates an included adhesive, and is flexible and is commercially referred to as the Unique 1400 (eg., "Unique" presumptively referencing the "unique" operative protocol, in contrast to, eg., "Q5" which is an alternative operative protocol). The Unique 1400 is compact indeed, having a disc shape with opposite flat faces and measuring about 0.55 mm thick with outside diameters in either 20 mm, 30 mm or 50 mm sizes (ie., part nos. 911424 (ø 20 mm), 911434 (ø30 mm), and 911454 (ø50 mm). The size of the internal transponder is not known but certainly smaller still.

Applicant prefers to utilize HID Corp.'s transponders and more preferentially the "eProx Tag," model no. 1390. Relatively speaking the "eProx Tag," model no. 1390 is relatively larger than the foregoing Sokymat examples as the HID model no. 1390 measures approximately 27 mm in outside diameter. The major part of the "eProx Tag," model no. 1390, or that is all the annular coil portion and most of the center, measures as thin as about 0.25 mm thick. However the "eProx Tag," model no. 1390 is characterized by a central hump which gives an elevational thickness at that central hump of about 0.9 mm thick. Hence the HID Corp.'s "eProx Tag," model no. 1390 is bulkier than the foregoing Sokymat examples but size matters in terms of operating distance. The Sokymat examples have a practical operating distance range of about 200 mm (~8 inches). The HID Corp.'s "eProx Tag," model no. 1390 is obviously bigger, and in consequence has a more robust operating range than the foregoing Sokymat examples.

The Sokymat examples show some of the following other characteristics. The glued-on models measure only about 0.4 mm thick whereas the adhesive-backed model (ie., the Unique 1400) measures 0.55 mm thick, or about 38% thicker.

Under applicant's above-referenced U.S. priority patent application Ser. No. 09/932,453, filed Aug. 16, 2001, applicant has produced and commercially introduced a fixture product embodying aspects shown by FIGS. 3 through 4b and 6 through 9 herein. Applicant's fixture product has proved to be popular, and there is great demand for it. Apparently its success can be attributed to the following factors. Its thinness along its circular edge avoids many snagging problems. Its adhesive backing permits attachment to about anything including leather and other natural and synthetic textile materials. Its flexibility allows it to flex to conform to warped surfaces like a wallet as well as remain affixed during use and flexion of the wallet. Very significantly, applicant's fixture product in accordance with FIGS. 3 through 4b and 6 through 9 herein is advantageously economical. Applicant's fixture product is a desirably affordable because its materials and the method of its construction are provide a low-end price with high-end toughness, durability and adaptability to attachment to about anywhere on anything.

Applicant has advanced the state of the art of its product with the improvements more particularly explained in connection with FIGS. 10 through 15 below. Additional aspects and objects of the invention will be apparent in connection with the discussion further below of preferred embodiments and examples.

SUMMARY OF THE INVENTION

It is an object of the invention to broaden the uses of a miniature thin-profile RFID proximity transponder by providing an inventive fixture for it which increases survivability of the attachment of the fixture and miniature thin flat RFID transponder to another article.

It is another object of the invention that the above fixture enhance survivability of the attachment of the fixture and miniature thin-profile RFID proximity transponder to other article in cases when the other article provides a disadvantageous curved and/or flexible surface.

It is an alternate object of the invention to implement the miniature thin-profile RFID proximity transponder in service of arming/disarming premise-monitoring control panels by means of conveniently and securely attaching it to a user article as stored on a key chain or in a wallet or else the wallet by virtue of the inventive fixture.

These and other aspects and objects are provided according to the invention in a combination soft "fixture" or patch composite and a miniature thin-profile RFID proximity transponder. The miniature thin-profile RFID proximity transponder is characterized by having a thin profile bounded by a peripheral edge that spaces opposed sides including a basal side which is adapted for resting stably on a flat surface and a crown side optionally having various elevational features.

The soft patch composite is characterized by comprising a cap and a planar base, both produced from thin flexible plastic sheet stock. The cap has interior and exterior sides and is formed with a inset center. The inset center is bounded by a relatively planar, relatively floppy brim that is bounded by a spaced outer edge. The inset center is shaped and inset to define an open cavity to closely accommodate the transponder's crown side as well as the peripheral edge and while yielding to allow some elevational distortion with the inset center when the transponder's basal side is generally aligned coplanar with the cap's relatively planar brim if the transponder's crown side has certain, distortion-producing elevational features.

The planar base has adjacent and subadjacent sides bounded by an outer edge sized substantially matching the cap's outer edge for closing the open cavity. The planar base also has at least a partial coating layer of adhesive on the base's subadjacent side.

An ultrasonically welded seam is utilized to join the relatively planar brim portion of the cap's interior side with a matching portion of the base's adjacent side to form thereby an ultrasonically-welded relatively planar, relatively floppy brim composite. Given the foregoing, the transponder is situated in the closed cavity in such a close fit that allows some elevational distortion with the inset center if the transponder's crown side has certain, distortion-producing elevational features. In consequence, the adhesive on the base's subadjacent side allows adhesive attachment of the combination soft patch composite and transponder to another article.

The inset center optionally comprises a low-profile disc shape or optionally alternatively comprises progressive tiers of low-profile disc shapes of progressively smaller outside diameters.

It is advantageous if the combined elevational thickness of the ultrasonically-welded brim composite comprising the adhesive layer and thickness of the stock material used in the cap and base is less than the greatest elevational thickness of the transponder in order to provide a relatively thin outer edge for the ultrasonically-welded brim composite and thereby increase survivability of the combination soft patch composite and transponder from being scraped off the other article.

It is an aspect of the invention that the ultrasonically-welded brim composite comprising the adhesive layer and the flexible stock material used in the cap and base is relatively floppy as a composite. That way, this allows attachment of the combination soft patch composite and transponder to flexible articles and thereby allowing the brim composite to flex with flexion of a given other, flexible article, which further increases the survivability of the combination soft patch composite and transponder from being scraped off said given other article.

It is another aspect of the invention that the transponder has a construction that while is relatively stiffer to flexion than the relatively floppy brim composite, it nevertheless allows limited flexion, which further accommodates attachment of said combination soft patch composite and transponder to flexible articles and thereby allows said soft patch composite and transponder in combination to flex with flexion of the given other, flexible article. This promotes even better survivability of the combination soft patch composite and transponder from being scraped off said given other article.

Optionally, the cap and base are produced from polycarbonate stock. Additional aspects and objects of the invention will be apparent in connection with the discussion further below of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 5 is a perspective view of an operative use for the inventive combination fixture and miniature RFID proximity transponder, as shown attached to a wallet-sized plastic card such as a credit or ATM card or the like;

FIG. 8 is an exploded elevational side view of FIG. 7;

FIG. 9 is an enlarged scale partial sectional view taken along line IX—IX in FIG. 6;

DETAILED DESCRIPTION OF THE PREFERRED EMBODIMENTS

Figure 2:
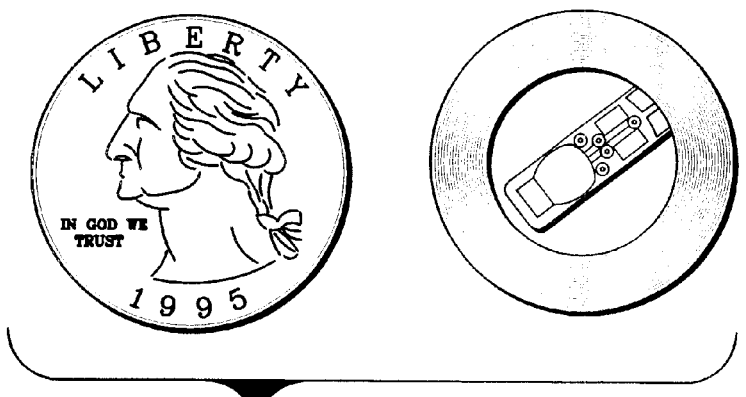
FIG. 2 is a pictorial view of a miniature RFID proximity transponder of the prior art, wherein a U.S. quarter-dollar coin is shown for scale.
Figure 3:
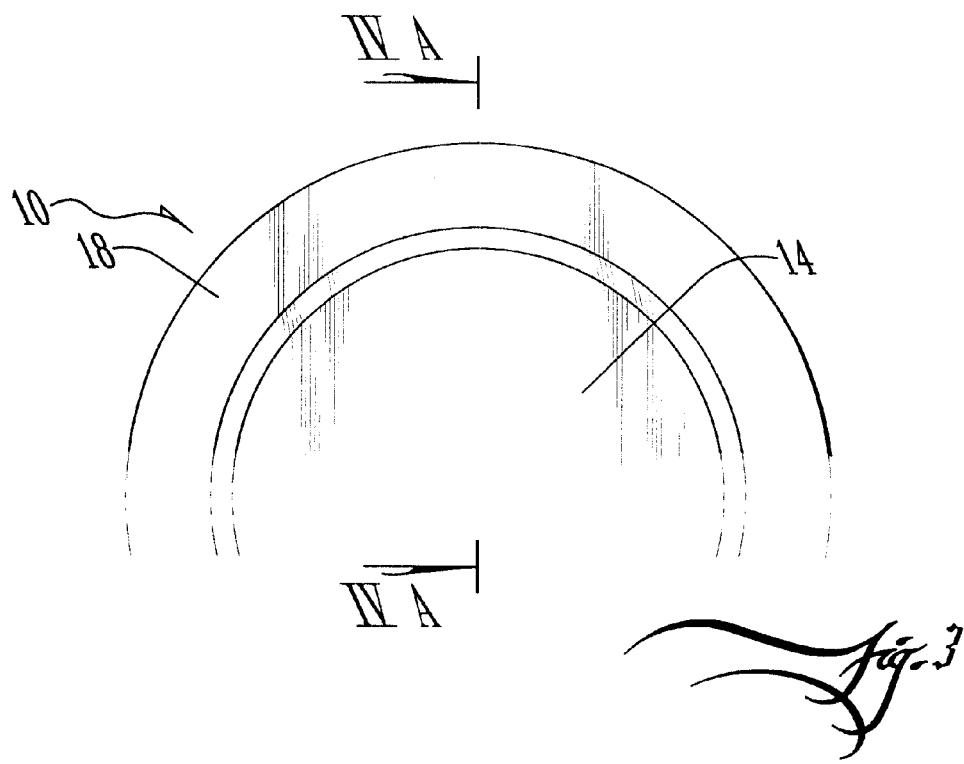
FIG. 3 is a plan view, partly broken away, of one embodiment of a fixture in accordance with the invention to mount a miniature proximity transponder of the prior art to another article.
Figure 4:
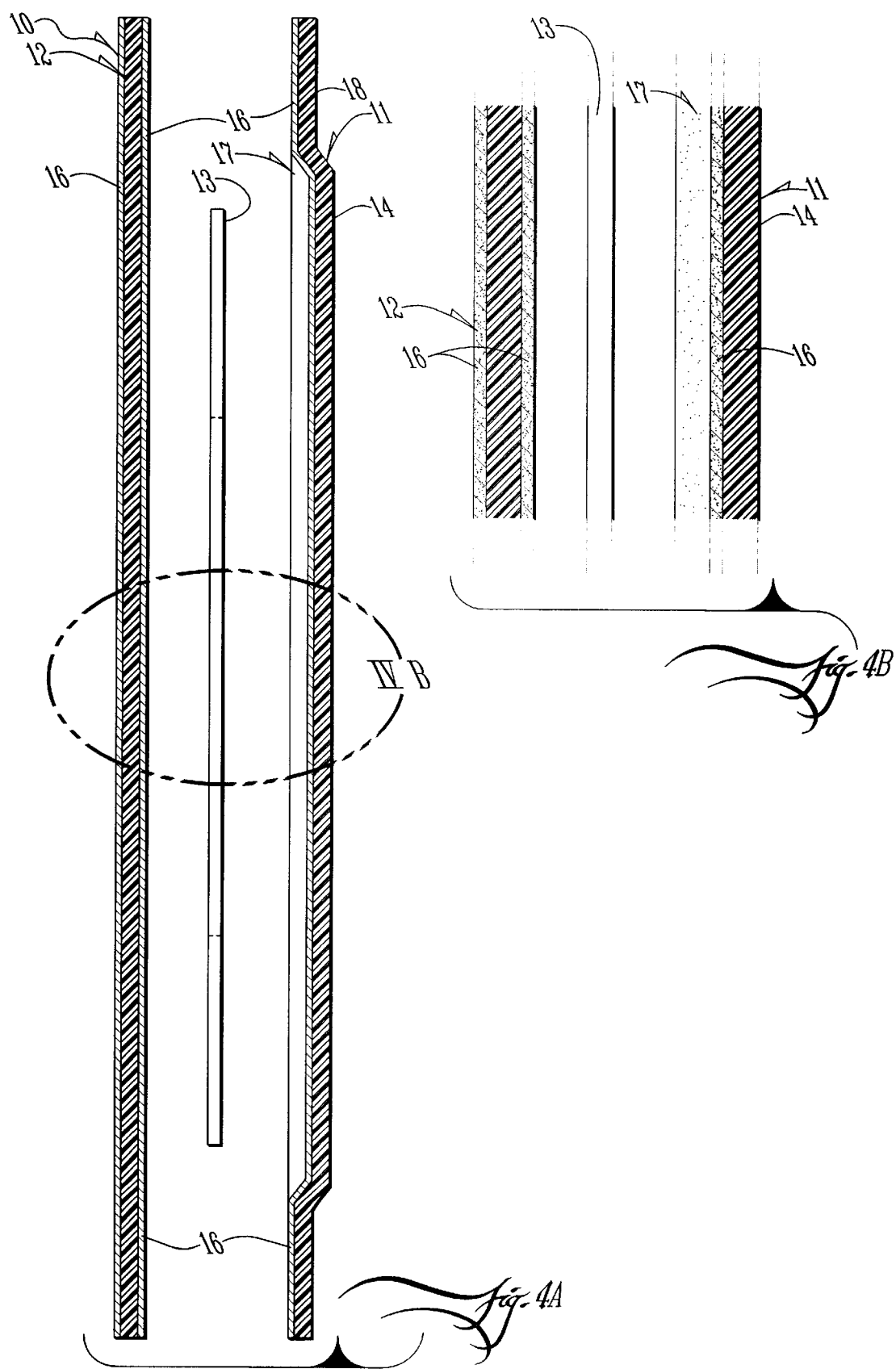
FIG. 4a is an exploded section view taken along line IVA—IVA in FIG. 3.
FIG. 4b is an enlarged scale section view, with portions broken away, of detail IVB in FIG. 4a, which for illustrative purposes only provides an exaggerated horizontal scale.

FIG. 2 shows a miniature RFID proximity transponder in accordance with the prior art or one which more particularly corresponds to the "eProx Tag," model no. 1390, of HID Corporation. Briefly, the miniature RFID proximity transponder has a tightly wound, fine wire coil/antenna encircling an operative circuit device. The size of the transponder's antenna/coil is comparably the size of a U.S., Washington quarter-dollar coin.

FIGS. 3 through 4b and 6 through 9 show one embodiment of a fixture 10 in accordance with the invention for mounting the miniature proximity transponder of FIG. 2 to another article. Such other articles 20 are diagrammatically indicated in FIG. 1. To return to FIGS. 3 through 4b and 6 through 9, the inventive fixture product 10 can be likened to an adhesive patch.

Figure 1:
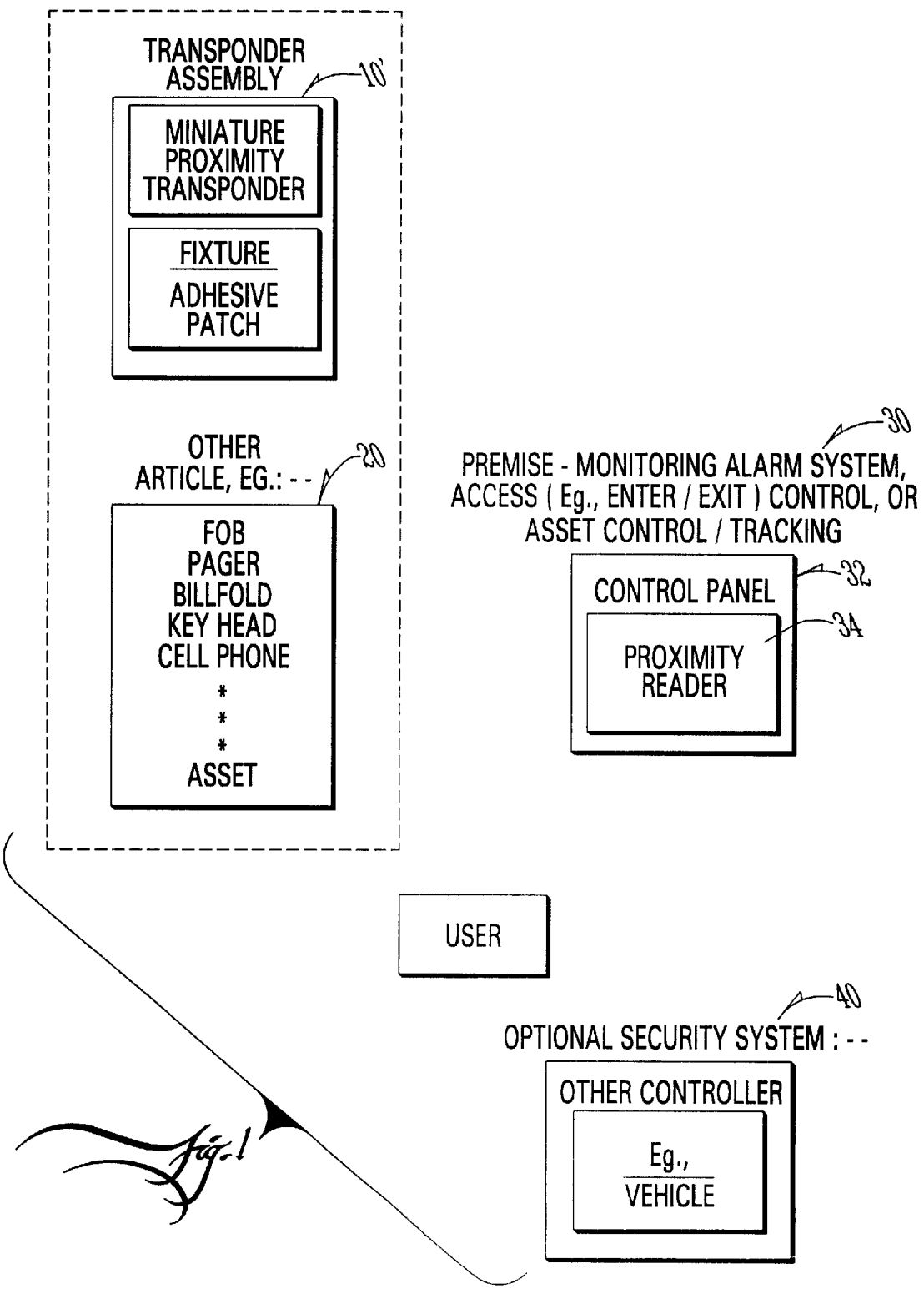
FIG. 1 is a diagrammatic view of a fixture to mount a miniature proximity transponder to another article in accordance with the invention, as shown in an example operative use environment of arming and/or dis-arming various security systems including without limitation, a premise-monitoring alarm controller, or an access controller or an asset tracking system.

Back in FIG. 1, it gives a diagrammatic view of one example operative use environment for the fixture 10 in accordance with the invention. The transponder is preferably deployed for arming and/or dis-arming or otherwise activating/-deactivating/signaling a security system controller 32.

Referring once again to FIGS. 3–4b and 6–9, the inventive fixture 10 preferably but not exclusively comprises the following. That is, despite that suitable variation is possible with the following, the inventive fixture 10 preferably comprises:—an embossed cap 11 and flat base 12 of plastic sheet pieces sized and arranged to sandwich between themselves a miniature proximity transponder 13. The referenced transponder 13 corresponds or is comparable to the miniature proximity transponder of FIG. 2, eg., the HID Corp.'s "eProx Tag," model no. 1390.

The embossed cap 11 may comprise for example a plastic sheet stock such as General Electric® model no. 8B35 poly-carbonate sheet, cut-out into a circle measuring about 33 mm-diameter (1.275 inches-diameter). In the preferred example, the sheet stock 11 preferably measures about 0.38 mm thick (15 mils (in.) thick). The cap 11's raised center 14 measures about 27 mm-diameter (1.075 inch-diameter). The raised center is deformed away from the plane of annular ring 18 to give about 0.254 mm inset (10 mils (in.) inset) internal spacing 17 (not to scale in FIGS. 4a or 4b, but more approximately to scale in FIGS. 7–9). The embossed cap 11's outer surface is roughened to give a velvet or satin finish (eg., terms of art). The top or outside surface allows printing with reverse-image, silk-screened artwork (not shown). The opposite surface is also coated with about a 0.05 mm thick (2 mil (in.) thick) coating 16 of adhesive. The adhesive coating 16 might be for example a 3M® Corporation product selling under model no. 7959.

The flat base 12 may comprise for example 0.13 mm thick (5 mil (in.) thick) poly-carbonate sheet material cut-out into a circle measuring likewise about 33 mm-diameter (1.275 inches-diameter). Both opposite surfaces are covered with about a 0.05 mm thick (2 mil (in.) thick) coating 16 of adhesive such as and without limitation, the above-mentioned 3M® model no. 7959. The flat base 12 and embossed cap 11 make adhesive-adhesive contact with one another along the cap 11's annular ring portion 18. The miniature proximity transponder 13 is pocketed inside the raised central portion 14 of the embossed cap 11. The transponder 13 is enveloped in adhesive 16 on all sides by both the flat base 12 and embossed cap 11. Another possible adhesive material might include Scotch® Brand's model no. 467MP 'Hi Performance Adhesive,' which brand is also a product of the 3M® Corporation, Minneapolis, Minn.

Figure 7:
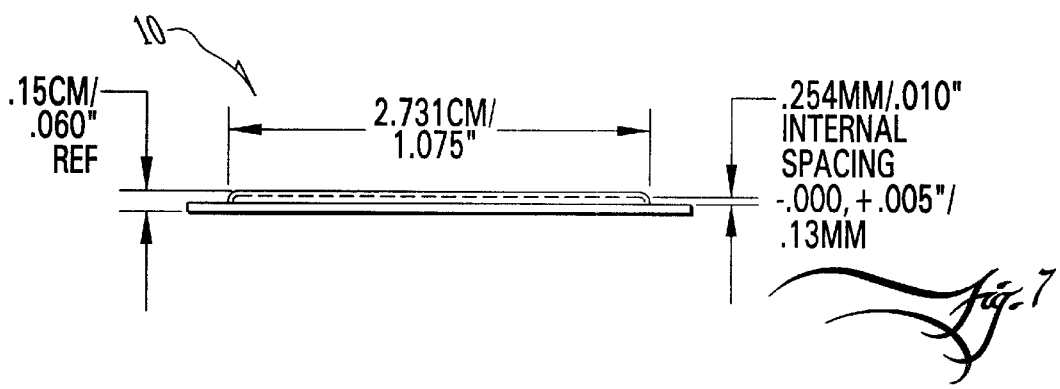
FIG. 7 is an elevational side view thereof.
Figure 10:
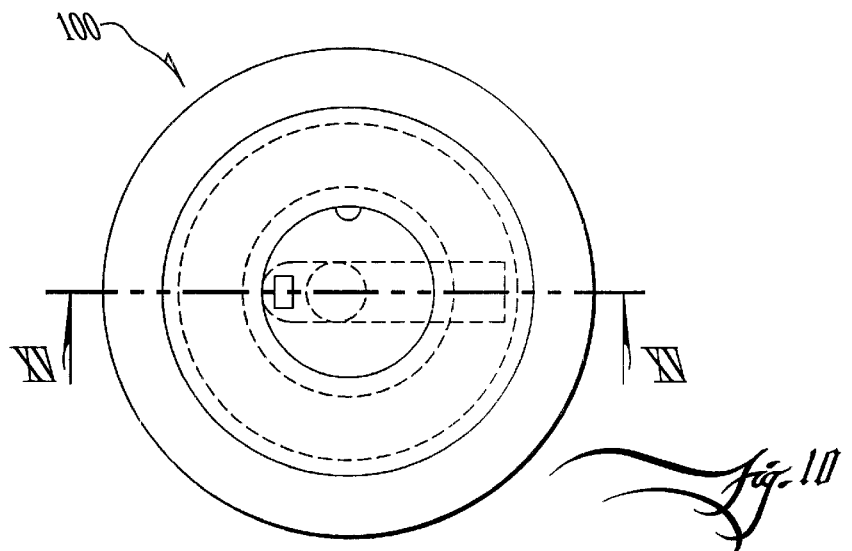
FIG. 10 is a plan view comparable to FIG. 6 except showing an alternate embodiment of a fixture in accordance with the invention to mount a miniature proximity transponder of the prior art to another article.
Figure 11:
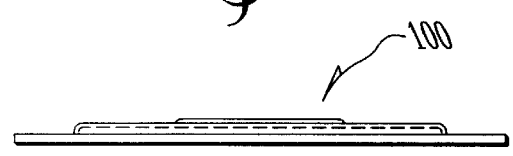
FIG. 11 is an elevational side view thereof.
Figure 12:
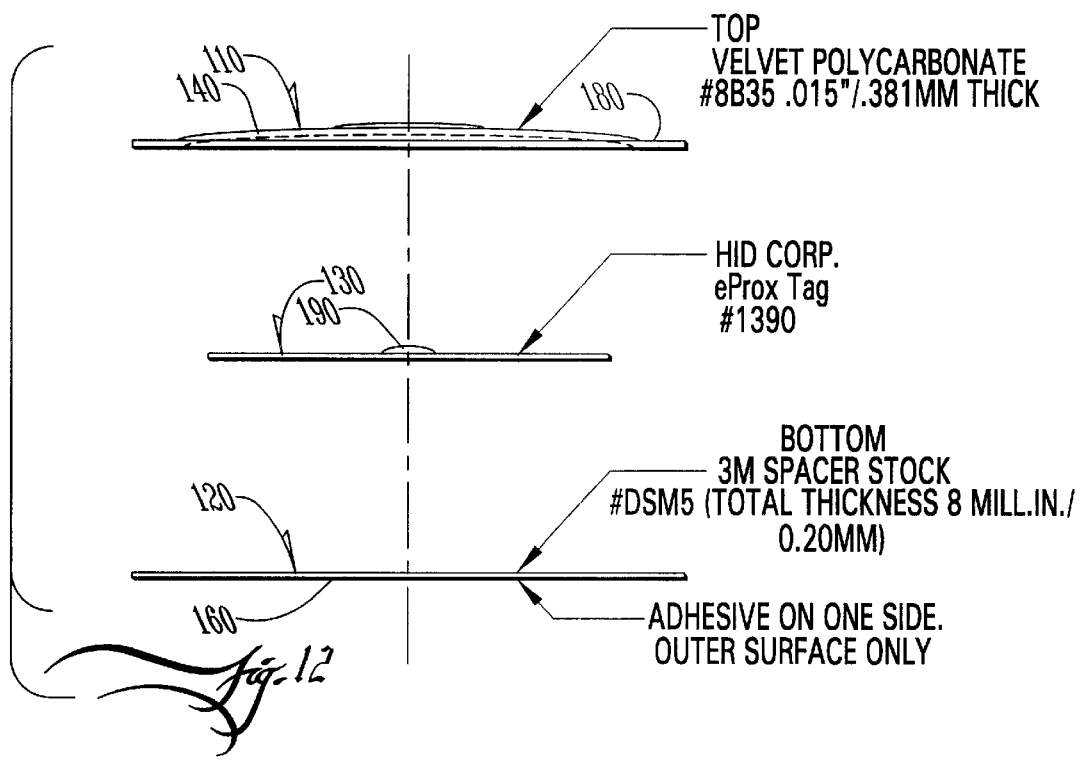
FIG. 12 is an exploded elevational side view of FIG. 11.
Figure 13A:
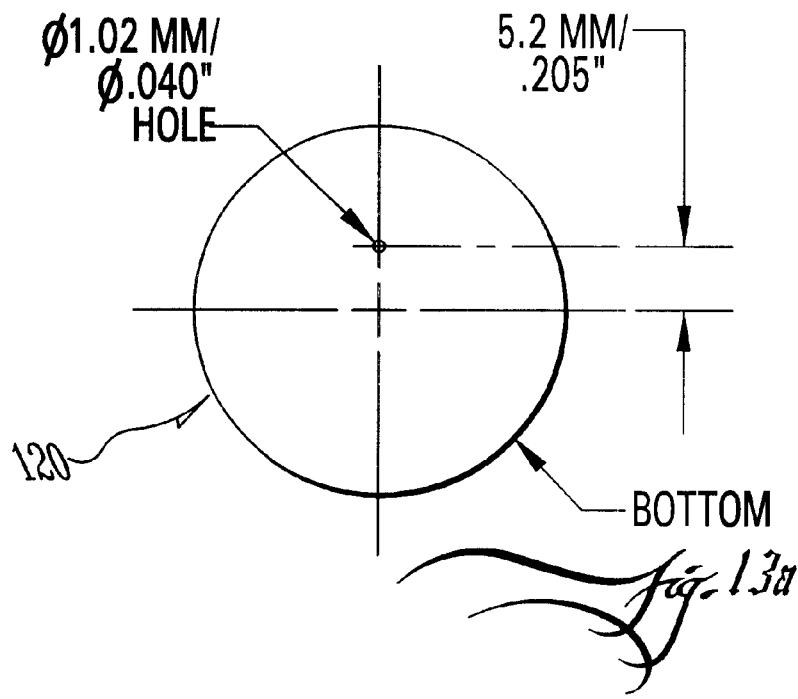
FIG. 13a is a plan view of the flat base or "bottom" only.
Figure 13B:
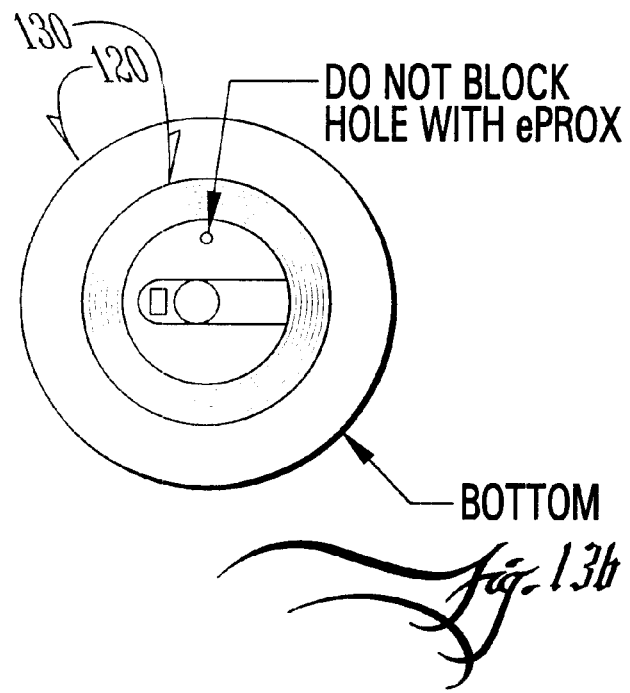
FIG. 13b is a plan view comparable to FIG. 13a except showing the pre-assembly placement of the miniature proximity transponder on the flat base.
Figure 14:
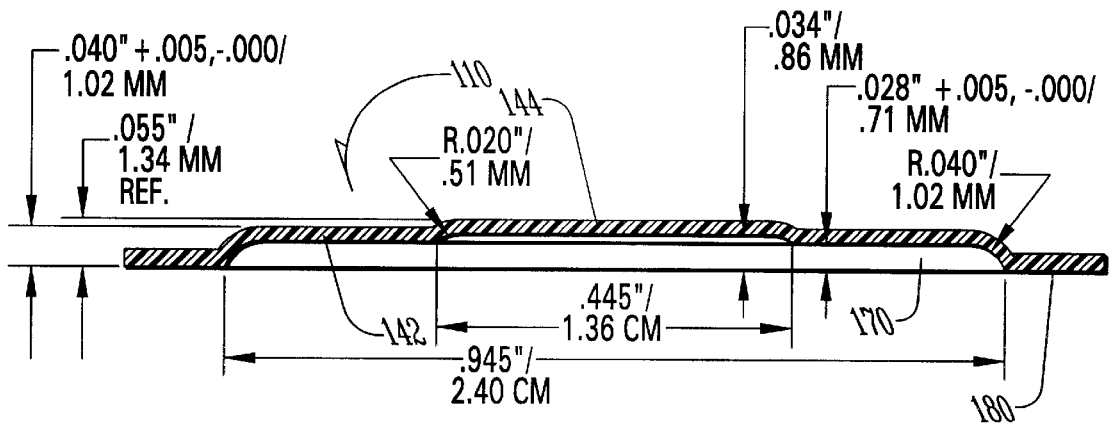
FIG. 14 is an enlarged scale partial view taken along line XV—XV in FIG. 10 except showing the embossed cap or "top" only; and, FIG. 15 is an enlarged scale, complete sectional view taken along line XV—XV in FIG. 10.

The embossed cap 11 is preferably produced from flat sheet stock. It is formed into shape by a forming or pressing second operation as is known in the art. The central raised (or more aptly, impressed) portion 14 is preferably sized so that the internal spacing or concavity 17 closely fits the miniature proximity transponder 13. FIG. 7 shows that the embossed cap 11 provides a nominal internal spacing of 0.254 mm (0.010 mil (in.)) for retention of the transponder 13. FIG. 8 shows in the middle elevation thereof an example miniature proximity transponder 13 such as the "eProx Tag," model no. 1390, of the HID Corp. The "eProx Tag," model no. 1390 measures very approximately 27 mm in outside diameter. The major part of the "eProx Tag," model no. 1390, or that is all the annular coil portion and most of the center, measures as thin as about 0.25 mm thick. However the "eProx Tag," model no. 1390 is characterized by a central hump (not shown in FIGS. 4b or 4b, but indicated as 19 in FIGS. 8 and 9) which gives an elevational thickness there (ie., at that central hump 19) of about 0.9 mm thick. FIG. 9 shows that the central hump distorts the embossed cap 11 to give its embossed portion 14 a low crown or dome. At the zenith of the crown the fixture product or patch 10 measures about 1.5 mm (0.060 inches) thick. Nevertheless the edges of the fixture product or "patch" 10 measure a relatively thin 0.6 mm thick (24 mils (in.) thick).

Although the fixture 10 has been described terms of specific measurements and materials, persons having routine skill in the art would recognize that there are other suitable changes or substitutions that can be made and yet still the end result would be encompassed by the teachings of the invention. Accordingly, the measures and materials named or recited are used merely used for convenience in this description for sake of a non-limiting example and thus do not specifically limit the invention.

FIG. 1 shows various representative user-articles 20 to which a user might attach the fixture assembly 10'. It could be attached to a fob on a key chain or ring. Alternatively, the fixture assembly 10' can be alternatively attached to, briefly stated, a key, a pager, a wallet, a cell phone, an employee badge and so on. In cases of asset tracking, the fixture assembly 10' can be attached to about any sort of asset. Preferably the fixture assembly 10' would be mounted in a hidden, out-of-sight place to frustrate its removal.

Figure 5:
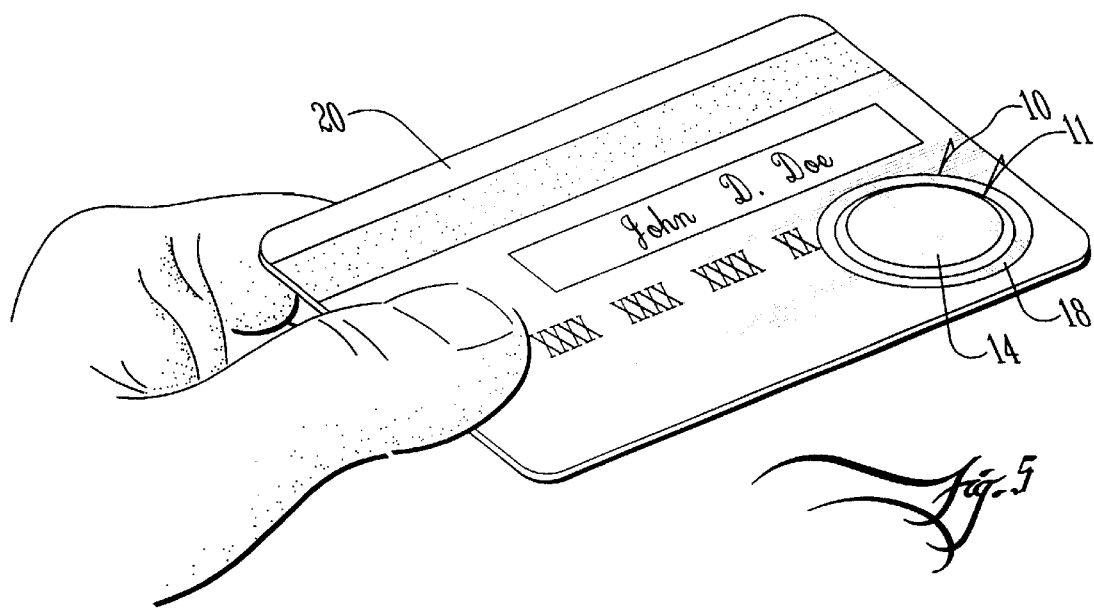
Figure 6:
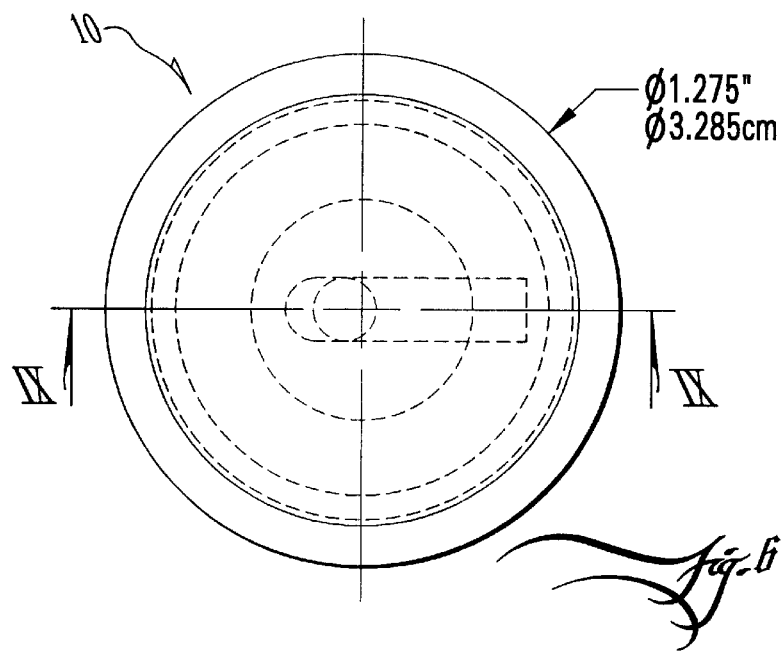
FIG. 6 is a plan view on a reduced scale corresponding to FIG. 3 except including hidden lines to reveal the miniature proximity transponder encased inside.

FIG. 5 provides a view of an alternate operative use environment for the inventive combination assembly (eg., 10' in FIG. 1) of fixture 10 and miniature RFID proximity transponder (ie., enveloped under embossed center 14), as shown attached to a wallet-sized plastic card (eg., 'other article' 20) such as a credit or ATM card or the like.

Referring back to FIG. 1, it shows a primary security system 30, which might be a premise-monitoring alarm system, an access control system, or an asset control system or the like. The security system 30's functions are generally controlled by a controller or control panel 32. These functions likely include arming and dis-arming the system 30. The controller 32 is linked to an RFID technology proximity reader 34. The reader 34 is configured to the control panel 32 for arming/dis-arming or otherwise communicating with the alarm system 30 in event of a transponder moving through the reader 34's field. The transponder is presumptively transported through the reader 34's field by carrying by a user.

To return to the fob, nowadays many cars have electronic-key entry. The electronic-key takes the form of a fob. FIG. 1 shows that a user might use the electronic-key fob to gain access to the optional premise 40, which in FIG. 1 is shown as the user's vehicle. The fixture assembly 10' would be attached to the fob and be used in cases to arm or disarm, eg., the user's residential burglary alarm. That way one article— the fob 20 (or, eg., the plastic card in FIG. 5)—has dual utility. It is both an electronic key for the vehicle 40 as well as a proximity transponder for activating/de-activating the primary security system 30. The transponder in the fixture assembly 10' does so automatically. Exiting a door having a nearby reader arms the alarm system 30. Re-entering the door disarms the alarm system 30.

It is also seen nowadays that keys of certain automobile manufacturers have relatively enlarged key heads. These enlarged key heads provide sufficient surface area to which the inventive fixture assembly 10' may be attached. The advantage of attaching the fixture assembly 10' to an electronic-key fob or a key is that, it ensures that if the user is in possession of the means to enter his vehicle, he can also arm or dis-arm the alarm the other primary security system 30, eg., the access controller 30 at his place of work or else the alarm control panel 30 at his residence, and so on.

Given the foregoing, the invention provides several advantages. The thin film fixture 10 provides a very thin profile, especially around its peripheral edge 18. That way, the fixture 10 is not easily scraped off, if at all, from the article 20 to which it is mounted.

Consider the tiddly wink fixture mentioned above in connection with the prior art. The prior art tiddly wink fixture typically has a square-edged periphery that measures in excess of 60 mils thick. The tiddly wink is also rigid. If the mounting surface is a billfold, then the mounting surface is flexible. Flexion of the mounting surface under the tiddly wink causes some of the grip of the bonding agent to give. Hence about half of the tiddly wink becomes unattached. The next opportunity the tiddly wink is scraped against something, it likely risks coming off.

On the other hand, the fixture 10 in accordance with the invention provides a much thinner edge 18 which is also flexible. The transponder measure about 35 mils thick. The combined thickness of the flat base 12, transponder 13, and raised central portion amounts to about 55 mils thick or so. However, at the annular rim portion 18, the thickness gets down to about 20 mils thick or so. As was said previously, the recitation of actual measurements is given for convenience in this description and is not especially limiting on the invention.

It is further preferred if the annular rim portion 18 is relatively narrow. That way, the diameter of the mounting fixture 10 is proportionately not much bigger than the diameter of the antenna/coil of the transponder 13 (see, eg., FIG. 2 for antenna/coil). The fixture 10 thus allows mounting to surfaces portions of articles 20 correspondingly not much bigger than the diameter of the transponder 13's antenna/coil. More significantly, the rim portion 18 is flexible. The thin gauge sheets of poly-carbonate are simply flexible. This enhances more durable attachment to flexible surfaces such as billfolds. This also enhances more durable attachment to warped surfaces such as on some cell phones, pagers, or key heads. Simply put, trials show that the inventive fixture 10 stays more durably attached to a wider variety of articles than the prior art tiddly wink device.

A further advantage is the following. The fixture assembly 10' allows the user to great ease of convenience is choosing where to place the fixture 10 on the chosen article 20. The prior tiddly wink device works best if epoxied—which involves clamping and resting time for setting—or else hot-gluing which takes a special equipment. With the inventive fixture 10, the user simply peals off a paper backing (not shown) and applies the fixture instantly to another article 20 wherever the user likes.

The advantage of much this eliminates the user from having to track the whereabouts of one more article 20 just to arm and dis-arm a security system 30. That is, given the predecessor RFID proximity transponders, which were contained in a plastic card (not shown), a user had to add this plastic card to his billfold, or else carry it along in much the same as her employee badge. The fixture assembly 10' eliminates all that. The user chooses his or her most preferred article 20 under the circumstances, and attaches the fixture assembly 10' to that. For example, assume that the user employs the proximity transponder to arm and dis-arm her residential alarm system 30. If the user is in the habit of never leaving the residence without her car keys, then certainly attaching the fixture assembly 10' to the car key (if that will work) makes good sense. Also, the arming/dis-arming is done automatically. The user just walks by a reader 34 with the transponder (ie., car keys 20) coming somewhere with the reader 34's field.

The above-referenced companion U.S. Provisional Application, No. 60/226,256, filed Aug. 17, 2000, prefers to construct the fixture 10 by omitting the flat base 12. Hence, in accordance with that disclosure, the fixture assembly 10' is simply put together by just assembling the embossed cap 11 with the transponder 13.

FIGS. 10 through 15 show an alternate embodiment of a fixture 100 in accordance with the invention for mounting the miniature proximity transponder 130 like shown by FIG. 2 to another article. As mentioned above the inventive fixture product 100 can be likened to an adhesive patch.

Briefly, the inventive fixture 100 preferably but not exclusively comprises a double-tiered embossed cap 110 and flat base 120 of plastic sheet pieces sized and arranged to sandwich between themselves a miniature proximity transponder 130. The referenced transponder 130 corresponds or is comparable to the miniature proximity transponder of FIG. 2, eg., a HID Corp.'s "eProx Tag," model no. 1390.

The embossed cap 110 may comprise for example a plastic sheet stock such as General Electric® model no. 8B35 poly-carbonate sheet, cut-out into a circle measuring about 33 mm-diameter (1.275 inches-diameter). In the preferred example, the sheet stock 110 preferably measures about 0.38 mm thick (15 mils (in.) thick). The cap 110's double-tiered raised center 140 measures at its widest about 24.5 mm-diameter (0.965 inch-diameter). The raised center 140 is deformed away from the plane of annular ring 180 in a double-tier fashion to produce a lower tier 142 and within that another and relatively upper tier 144. The lower tier 142 measures about 23 mm inside-diameter (0.945 inches inside-diameter) and is embossed away from the plane of the annular rim 180 by about 71 mm inset (0.028 inches inset) internal spacing. The upper tier 144 measures about 11.3 mm inside-diameter (0.445 inches inside-diameter) and is embossed away from the plane of the lower tier 142 by a further 0.15 mm inset (6 mils (in.) inset) internal spacing, or corresponding to a cumulative inset from the plane of the annular rim 180 of 0.86 mm inset (0.034 inches inset) internal spacing. Again the embossed cap 110's outer surface might be roughened to give a velvet or satin finish (eg., terms of art). The top surface allows printing with reverse-image, silk-screened artwork (not shown) as long as the graphics and/or printing does not extend into the annular rim 180.

The flat base 120 may comprise for example 0.20 mm thick (8 mil (in.) thick) composite of poly-carbonate sheet material and an adhesive layer 160 which is cut-out into a circle measuring likewise about 33 mm-diameter (1.275 inches-diameter).

It is an aspect of the invention in consideration of this alternate embodiment that the cap 110 and base 120 are ultrasonically welded together along the seam defined by the cap 110's annular rim portion 180. This eliminates the adhesive-to-adhesive bonding of the FIGS. 3–4b and 6–9 version. Ultrasonic welding forms a more secure connection which is more resistant to peeling apart than adhesive-to-adhesive bonding.

The outside or bottom surface of the base 120 is coated with about a 0.05 mm thick (2 mil (in.) thick) layer of adhesive 160 such as and without limitation, the above-mentioned 3M® model no. 7959. Another possible adhesive material might include Scotch® Brand's model no. 467MP 'Hi Performance Adhesive,' which brand is also a product of the 3M® Corporation, Minneapolis, Minn.

The miniature proximity transponder 130 is pocketed inside the double-tiered raised central portion 140 of the embossed cap 110. The transponder 130 is enveloped by the double tiers 142 and 144 to accommodate the transponder 130's central hump 190 as shown. Thus the embossed cap 110 is preferably produced from flat sheet stock. It is formed into shape by a forming or pressing second operation as is known in the art. The central raised (or more aptly, impressed) portion 140 is preferably sized so that the internal spacing or concavity 170 closely fits the miniature proximity transponder 130.

Figure 15:
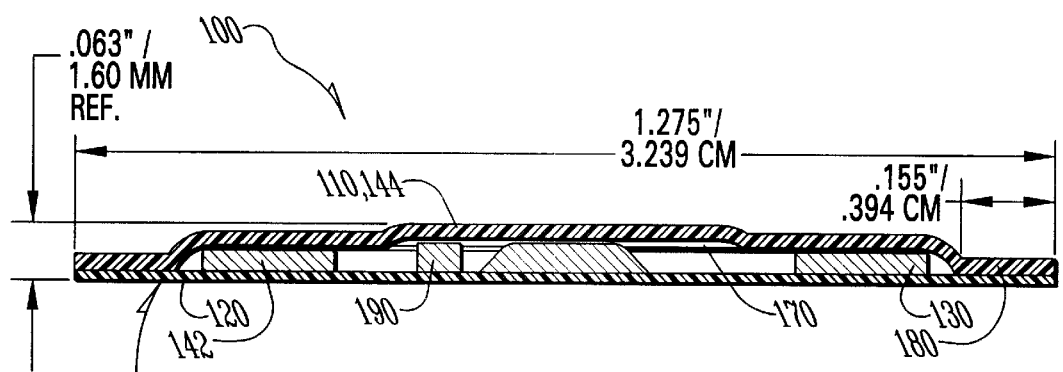

As mentioned previously, the transponder 130 measures very approximately 27 mm in outside diameter. The major part of the "eProx Tag," model no. 1390, or that is all the annular coil portion and most of the center, measures as thin as about 0.25 mm thick. However the "eProx Tag," model no. 1390 is characterized by a central hump 190 (eg., FIGS. 12 or 15) which gives an elevational thickness there (ie., at that central hump 19) of about 0.9 mm thick. FIG. 15 shows that the central hump 190 is accommodated within the double-tiered cap 110 without significantly distorting the embossed cap 110. Nevertheless, the cap 110 exhibits a two tier, low crown or dome. At the zenith of the crown the fixture product or patch 100 measures about 1.60 mm (0.063 inches) thick. Nevertheless the edges of the fixture product or "patch" 100 measure a relatively thin 0.58 mm thick (23 mils (in.) thick).

The flat base 120 include a small vent hole (eg., see FIGS. 13a or 13b) to accommodate the escape of gases during the ultrasonic weld process. Affixing the patch 100 to another article 20 accomplishes the adhesive layer 160 sealing closed the vent during use.

Although the fixture 10 and/or 100 have been described terms of specific measurements and materials, persons having routine skill in the art would recognize that there are other suitable changes or substitutions that can be made and yet still the end result would be encompassed by the teachings of the invention. Accordingly, the measures and materials named or recited are used merely used for convenience in this description for sake of a non-limiting example and thus do not specifically limit the invention.

The inventive fixture product or patch 100 has the potential to be very popular among distributers of RFID products and users. Its potential success can be attributed to the following factors. The patch 100's thinness along its circular edge avoids many snagging problems. The patch 100's adhesive backing permits attachment to about anything including leather and other natural and synthetic textile materials. The patch 100's flexibility allows it to flex to conform to warped surfaces like a warped cell-phone surface or wallet as then remain affixed during use and flexion flexible articles 20 such as a wallet. It is indeed helpful that the HID Corp.'s "eProx Tag," model no. 1390 withstands use or abuse as being flexed. Evidently the coil portion of the transponder 130 withstands flexion. Very significantly, however, the inventive fixture product or patch 100 in accordance with FIGS. 10 through 15 is advantageously economical. The inventive fixture product or patch 100 is a desirably affordable because its materials and the method of its construction combine low-end price in contrast with high-end toughness, high-end durability and high-end adaptability to attachment to about anywhere on about any article 20.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A combination fixture and miniature RFID proximity transponder comprising:

a miniature RFID proximity transponder having a thin profile bounded by a peripheral edge that spaces opposed sides, one of which is adapted for resting stably on a flat surface;

a fixture comprising a cap and a planar base, both produced from flexible plastic sheet stock;

wherein said cap has interior and exterior sides and which relative to the exterior side is formed with an embossed center, wherein said center is bounded by a planar rim that is bounded by an outer edge and wherein said center is shaped and inset to define an open cavity to closely fit around the miniature RFID proximity transponder's other side and peripheral edge such that the transponder's one side generally aligns coplanar with the cap's planar rim;

wherein said planar base has adjacent and subadjacent sides bounded by an outer edge sized substantially matching the cap's outer edge for closing the open cavity;

at least a partial coating layer of adhesive on the base's subadjacent side; and, an ultrasonically welded seam joining the planar rim portion of the cap's interior side with a matching portion of the base's adjacent side to form an ultrasonically-welded rim assembly whereby said transponder is situated in the closed cavity to thereby encase the transponder therein in such a close fitting closed cavity, said adhesive on the base's subadjacent side allowing adhesive attachment of the combination fixture and transponder to another article.

2. The combination of claim 1, wherein:

the combined elevational thickness of the ultrasonically-welded rim assembly comprising the adhesive layer and thickness of the stock material used in the cap and base is less than the greatest elevational thickness of the transponder in order to provide a relatively thin outer edge for the ultrasonically-welded rim assembly and thereby increase survivability of the combination from being scraped off the other article.

3. The combination of claim 2 wherein the ultrasonically-welded rim assembly comprising the adhesive layer and the flexible stock material used in the cap and base is cooperatively flexible as an assembly, which allows attachment of said combination to flexible articles and thereby allowing the rim assembly to flex with flexion of a given other, flexible article which further increases the survivability of the fixture from being scraped off said given other article.

4. The combination of claim 1 wherein the ultrasonically-welded rim assembly comprising the adhesive layer and the flexible stock material used in the cap and base is cooperatively flexible as an assembly, which allows attachment of said combination to flexible articles and thereby allowing the rim assembly to flex with flexion of a given other, flexible article which further increases the survivability of the fixture from being scraped off said given other article.

5. The combination of claim 1 wherein the cap and base are produced from polycarbonate stock.

6. A combination fixture and miniature RFID proximity transponder comprising:

a miniature RFID proximity transponder having a thin profile bounded by a peripheral edge that spaces opposed sides including a basal side which is adapted for resting stably on a flat surface and a crown side having various elevational features;

a fixture comprising a cap and a planar base, both produced from flexible plastic sheet stock;

wherein said cap has interior and exterior sides and is formed with a recessed center, wherein said center is bounded by a planar brim that is bounded by a spaced outer edge and wherein said center is shaped and inset to define an open recess to closely accommodate the transponder's crown side as well as the peripheral edge except with some elevational distortion in the recessed center when the transponder's basal side is generally aligned coplanar with the cap's planar brim;

wherein said planar base has adjacent and subadjacent sides bounded by an outer edge sized substantially matching the cap's outer edge for closing the open recess;

at least a partial coating layer of adhesive on the base's subadjacent side; and, an ultrasonically welded seam joining the planar brim portion of the cap's interior side with a matching portion of the base's adjacent side in an ultrasonically-welded brim composite whereby said transponder is situated in the closed recess in a close fit allowing some elevational distortion in the cap's center, said adhesive on the base's subadjacent side allowing adhesive attachment of the combination fixture and transponder to another article.

7. The combination of claim 6, wherein the recessed center comprises a low-profile disc shape.

8. The combination of claim 6, wherein the recessed center comprises progressive tiers of low-profile disc shapes of progressively smaller outside diameters.

9. The combination of claim 6, wherein:

the combined elevational thickness of the ultrasonically-welded brim composite comprising the adhesive layer and thickness of the stock material used in the cap and base is less than the greatest elevational thickness of the transponder in order to provide a relatively thin outer edge for the ultrasonically-welded brim composite and thereby increase survivability of the combination fixture and transponder from being scraped off the other article.

10. The combination of claim 9 wherein the ultrasonically-welded brim composite comprising the adhesive layer and the flexible stock material used in the cap and base is cooperatively flexible as a composite, which allows attachment of said combination fixture and transponder to flexible articles and thereby allowing the brim composite to flex with flexion of a given other, flexible article, which further increases the survivability of the combination fixture and transponder from being scraped off said given other article.

11. The combination of claim 6 wherein the ultrasonically-welded brim composite comprising the adhesive layer and the flexible stock material used in the cap and base is cooperatively flexible as a composite, which allows attachment of said combination fixture and transponder to flexible articles and thereby allowing the brim composite to flex with flexion of a given other, flexible article, which further increases the survivability of the combination fixture and transponder from being scraped off said given other article.

12. The combination of claim 6 wherein the cap and base are produced from polycarbonate stock.

13. A combination soft patch composite and miniature RFID proximity transponder comprising:

a miniature RFID proximity transponder having a thin profile bounded by a peripheral edge that spaces opposed sides including a basal side which is adapted for resting stably on a flat surface and a crown side optionally having various elevational features;

a soft patch composite comprising a cap and a planar base, both produced from thin flexible plastic sheet stock;

wherein said cap has interior and exterior sides and is formed with a inset center, wherein said center is bounded by a relatively planar, relatively floppy brim that is bounded by a spaced outer edge and wherein said center is shaped and inset to define an open cavity to closely accommodate the transponder's crown side as well as the peripheral edge and while yielding to allow some elevational distortion with the inset center when the transponder's basal side is generally aligned coplanar with the cap's relatively planar brim if the transponder's crown side has certain, distortion-producing elevational features;

wherein said planar base has adjacent and subadjacent sides bounded by an outer edge sized substantially matching the cap's outer edge for closing the open cavity;

at least a partial coating layer of adhesive on the base's subadjacent side; and, an ultrasonically welded seam joining the relatively planar brim portion of the cap's interior side with a matching portion of the base's adjacent side in an ultrasonically-welded relatively planar, relatively floppy brim composite whereby said transponder is situated in the closed cavity in such a close fit that allows some elevational distortion with the inset center if the transponder's crown side has certain, distortion-producing elevational features, said adhesive on the base's subadjacent side allowing adhesive attachment of the combination soft patch composite and transponder to another article.

14. The combination of claim 13, wherein the inset center comprises a low-profile disc shape.

15. The combination of claim 13, wherein the inset center comprises progressive tiers of low-profile disc shapes of progressively smaller outside diameters.

16. The combination of claim 13, wherein:

the combined elevational thickness of the ultrasonically-welded brim composite comprising the adhesive layer and thickness of the stock material used in the cap and base is less than the greatest elevational thickness of the transponder in order to provide a relatively thin outer edge for the ultrasonically-welded brim composite and thereby increase survivability of the combination soft patch composite and transponder from being scraped off the other article.

17. The combination of claim 16 wherein the ultrasonically-welded brim composite comprising the adhesive layer and the flexible stock material used in the cap and base is relatively floppy as a composite, which allows attachment of said combination soft patch composite and transponder to flexible articles and thereby allowing the brim composite to flex with flexion of a given other, flexible article, which further increases the survivability of the combination soft patch composite and transponder from being scraped off said given other article.

18. The combination of claim 13 wherein the ultrasonically-welded brim composite comprising the adhesive layer and the flexible stock material used in the cap and base is relatively floppy as a composite, which allows attachment of said combination soft patch composite and transponder to flexible articles and thereby allowing the brim composite to flex with flexion of a given other, flexible article, which further increases the survivability of the combination soft patch composite and transponder from being scraped off said given other article.

19. The combination of claim 18 wherein the transponder has a construction that while is relatively stiffer to flexion than the relatively floppy brim composite nevertheless allows limited flexion, which further accommodates attachment of said combination soft patch composite and transponder to flexible articles and thereby allows said soft patch composite and transponder in combination to flex with flexion of the given other, flexible article, which promotes even better survivability of the combination soft patch composite and transponder from being scraped off said given other article.

20. The combination of claim 13 wherein the cap and base are produced from polycarbonate stock.

\* \* \* \* \*